US010774810B2

(12) United States Patent
Deshpande et al.

(10) Patent No.: US 10,774,810 B2
(45) Date of Patent: Sep. 15, 2020

(54) SYSTEM AND METHOD FOR ESTIMATING HIGH BANDWIDTH TOWER DEFLECTION FOR WIND TURBINES

(71) Applicant: General Electric Company, Schenectady, NY (US)

(72) Inventors: Ameet Shridhar Deshpande, Schenectady, NY (US); Pranav Agarwal, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 15/137,397

(22) Filed: Apr. 25, 2016

(65) Prior Publication Data

US 2017/0306926 A1 Oct. 26, 2017

(51) Int. Cl.
*F03D 7/02* (2006.01)
*G01M 99/00* (2011.01)
*F03D 17/00* (2016.01)
*G01M 5/00* (2006.01)

(52) U.S. Cl.
CPC .......... *F03D 7/0296* (2013.01); *F03D 17/00* (2016.05); *G01M 5/0016* (2013.01); *G01M 5/0041* (2013.01); *G01M 5/0066* (2013.01); *G01M 99/004* (2013.01); *F05B 2260/821* (2013.01); *F05B 2270/1016* (2013.01); *F05B 2270/331* (2013.01); *Y02E 10/723* (2013.01)

(58) Field of Classification Search
CPC ... G06F 17/18; G01M 5/0066; G01M 5/0041; G01M 5/0016; G01M 99/004; F03D 17/00; F03D 7/0296; F05B 2270/1016; F05B 2260/821; F05B 2270/331; Y02E 10/723

See application file for complete search history.

(56) References Cited

U.S. PATENT DOCUMENTS

| 4,420,692 | A | 12/1983 | Kos et al. |
| 5,798,942 | A * | 8/1998 | Danchick .............. G01S 3/7864 342/36 |
| 7,317,260 | B2 | 1/2008 | Wilson |
| 7,822,560 | B2 | 10/2010 | LeMieux |
| 8,115,331 | B2 | 2/2012 | Wakasa et al. |

(Continued)

FOREIGN PATENT DOCUMENTS

| WO | WO2008/081232 A1 | 7/2008 |
| WO | 2016/004950 A1 | 1/2016 |

OTHER PUBLICATIONS

Nam, Y. and Yoon, T.J., "Laboratory-scale experiments on wind turbine nacelle movement estimation," Mechanical Systems and Signal Processing, vol. 23, Issue 8, pp. 2435-2444 (Nov. 2009).

(Continued)

*Primary Examiner* — Vongsavanh Sengdara
(74) *Attorney, Agent, or Firm* — Dority & Manning, P.A.

(57) ABSTRACT

The present disclosure is directed to a method for estimating tower loads, such as tower deflection, of a wind turbine. The method includes receiving an estimate of slow variations in thrust of a tower of the wind turbine. The method also includes determining, via one or more sensors, tower accelerations of the tower of the wind turbine. Thus, the method also includes estimating the tower loads of the wind turbine as a function of the estimate of slow variations in thrust of the tower and the tower accelerations.

19 Claims, 7 Drawing Sheets

(56) References Cited

U.S. PATENT DOCUMENTS

| | | |
|---|---|---|
| 8,174,137 B2 | 5/2012 | Skaare |
| 2005/0151377 A1* | 7/2005 | Ichinose ................ F03D 9/255 290/44 |
| 2009/0263245 A1 | 10/2009 | Shi et al. |
| 2011/0137586 A1 | 6/2011 | Jiang et al. |
| 2012/0139240 A1* | 6/2012 | Otamendi Claramunt .................. F03D 7/043 290/44 |
| 2013/0140820 A1* | 6/2013 | Tarnowski ................ H02J 3/24 290/44 |
| 2013/0195653 A1* | 8/2013 | Hayashi ................ F03D 80/00 416/1 |
| 2013/0214535 A1* | 8/2013 | Brath ...................... F03D 17/00 290/44 |
| 2013/0325373 A1* | 12/2013 | Qiao ..................... F03D 7/0296 702/58 |
| 2014/0003936 A1 | 1/2014 | Agarwal et al. |
| 2014/0328678 A1* | 11/2014 | Guadayol Roig .... F03D 7/0224 416/1 |
| 2015/0056072 A1* | 2/2015 | Perley ................... F03D 7/0288 416/1 |
| 2015/0137519 A1* | 5/2015 | Tarnowski .............. F03D 9/255 290/44 |
| 2015/0211492 A1* | 7/2015 | Garcia .................... F03D 7/048 290/44 |
| 2015/0377213 A1* | 12/2015 | Deshpande ........... F03D 7/0224 290/44 |

OTHER PUBLICATIONS

Nam, Y., et al., "Estimation of a nacelle dynamic motion of a wind turbine," 10th International Conference on Control, Automation, Robotics and Vision, pp. 1017-1020 (Dec. 17-20, 2008).

* cited by examiner

SYSTEM AND METHOD FOR ESTIMATING HIGH BANDWIDTH TOWER DEFLECTION FOR WIND TURBINES

FIELD OF THE INVENTION

The present invention relates to generally to wind turbines, and more particularly, to a system and method for estimating high bandwidth tower deflection for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower can account for up to 40% of its cost. As such, to reduce wind turbines costs, a lighter tower design having increased tower reliability is preferred. In such towers, however, it is critical to know when tower loads are near the design limit, i.e. by estimating tower deflection since wind turbine towers are analogous to springs. Conventional estimation approaches include estimating a slowly varying thrust from which steady-state tower deflection can be inferred.

However, more accurate estimation approaches would be desirable.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for estimating tower loads of a wind turbine. The method includes receiving, via a controller, an estimate of slow variations in thrust of a tower of the wind turbine. The method also includes determining, via one or more sensors, tower accelerations of the tower of the wind turbine. Thus, the method also includes estimating, via the controller, the tower loads of the wind turbine as a function of the estimate of slow variations in thrust of the tower and the tower accelerations.

In another aspect, the present disclosure is directed to system for estimating tower loads of a wind turbine. The system includes one or more sensors configured to measure tower accelerations of a tower of the wind turbine and a controller communicatively coupled with the one or more sensors. Further, the controller includes an estimator configured to perform one or more operations. More specifically, the one or more operations may include receiving an estimate of slow variations in thrust of the tower, estimating the tower loads of the wind turbine as a function of the estimate of slow variations in thrust of the tower and the tower accelerations. It should be understood that the system may be further configured with any of the additional features as described herein.

In yet another aspect, the present disclosure is directed to a method for estimating tower loads of a wind turbine. The method includes determining, via one or more sensors, an estimate of slow variations in thrust of a tower of the wind turbine. Another step includes determining, via one or more different sensors, an estimate of fast variations in thrust of a tower of the wind turbine. Further, the method includes estimating, via the controller, the tower loads of the wind turbine as a function of the estimate of slow variations in thrust of the tower and the estimate of fast variations in thrust of the tower. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
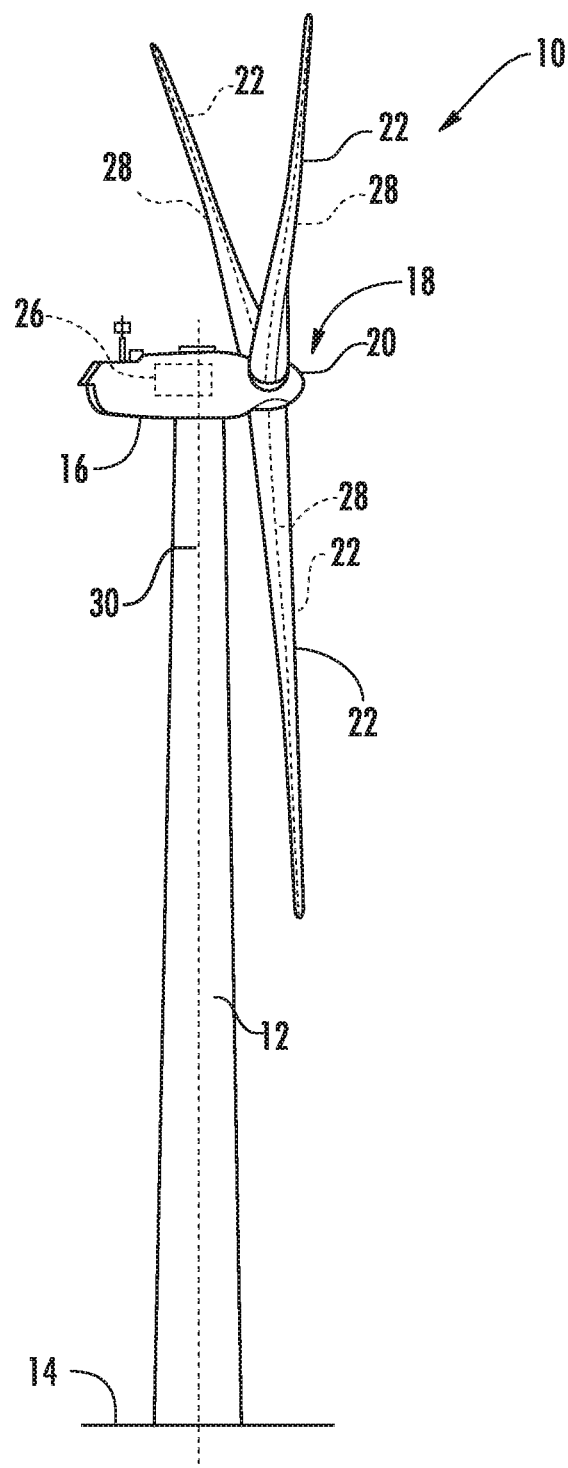
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned, it is critical to know when wind turbine tower loads are near the design limit, i.e. by estimating tower deflection since wind turbine towers are analogous to springs. Conventional estimation approaches include estimating a slowly varying thrust from which steady-state tower deflection can be inferred. The inventors of the present disclosure, however, have discovered that since the tower is highly underdamped, there can be large fast variations around such steady state deflection, especially during extreme gust events which govern tower loads. Hence, there is a need for improved high-bandwidth estimations of tower deflection which captures both slow and fast variations of thrust so as to reduce error at all frequencies.

Thus, the present disclosure is generally directed to improved systems and methods for estimating tower loads, such as tower deflection, of a wind turbine that account for both slow and fast variations in thrust. The method includes receiving an estimate of slow variations in thrust of a tower of the wind turbine and determining, via one or more sensors, tower accelerations of the tower of the wind turbine. Thus, the method also includes estimating the tower loads of the wind turbine as a function of the estimate of slow variations in thrust of the tower and the tower accelerations. As such, the method of the present disclosure is configured to estimate tower deflections that take into account both slow and fast variations in thrust.

The present disclosure provides many advantages not present in the prior art. For example, the present disclosure provides a more accurate estimate of tower deflection/load and thrust estimate acting on the wind turbine. Thus, the estimates can be used in control design such that evasive action can be initiated when close to the design limit. The tower deflection/load and thrust estimates can also be used in a tower life odometer. In addition, the improved tower velocity estimate can be used for better tower damping. Thus, the present disclosure provides many beneficial uses in reducing tower extreme and fatigue loads.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
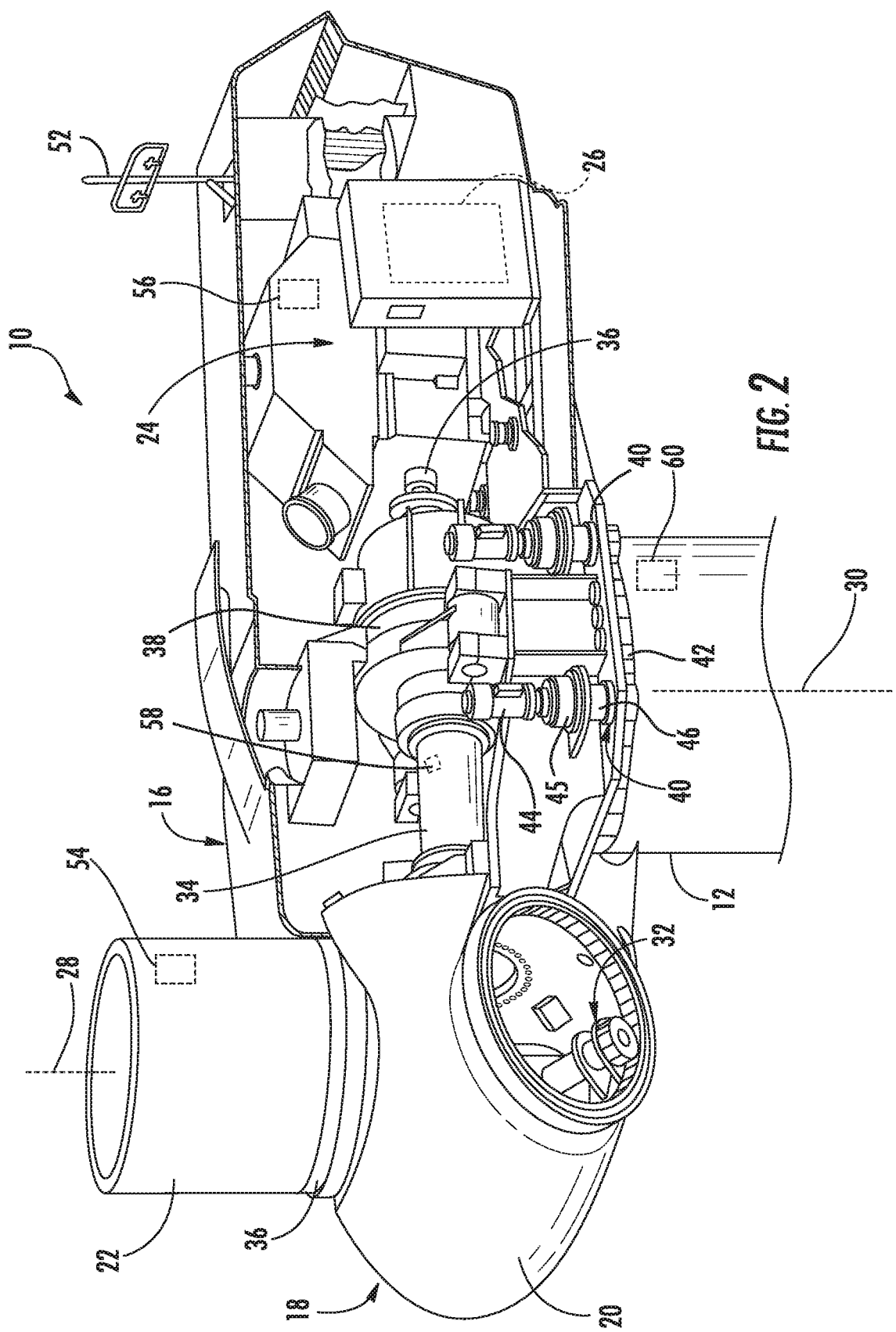
FIG. 2 illustrates a detailed, perspective view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may include a yaw drive mechanism 40 configured to change the angle of the nacelle 16 relative to the wind (e.g., by engaging a yaw bearing 42 of the wind turbine 10). Further, each yaw drive mechanism 40 may include a yaw drive motor 44 (e.g., any suitable electric motor), a yaw drive gearbox 45, and a yaw drive pinion 46. In such embodiments, the yaw drive motor 44 may be coupled to the yaw drive gearbox 45 so that the yaw drive motor 44 imparts mechanical force to the yaw drive gearbox 45. Similarly, the yaw drive gearbox 45 may be coupled to the yaw drive pinion 46 for rotation therewith. The yaw drive pinion 46 may, in turn, be in rotational engagement with a yaw bearing 42 coupled between the tower 12 and the nacelle 16 such that rotation of the yaw drive pinion 46 causes rotation of the yaw bearing 42. Thus, in such embodiments, rotation of the yaw drive motor 44 drives the yaw drive gearbox 45 and the yaw drive pinion 46, thereby rotating the yaw bearing 42 and the nacelle 16 about the yaw axis 30. Similarly, the wind turbine 10 may include one or more pitch adjustment mechanisms 32 communicatively coupled to the wind turbine controller 26, with each pitch adjustment mechanism(s) 32 being configured to rotate the pitch bearing 35 and thus the individual rotor blade(s) 22 about the pitch axis 28.

In addition, the wind turbine 10 may also include one or more sensors 52 for monitoring various wind conditions of the wind turbine 10. For example, as shown in FIG. 2, the wind direction, wind speed, or any other suitable wind condition near of the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art.

More specifically, as shown, the wind turbine 10 may also include additional sensors for monitoring various operating parameters of the turbine. Such sensors may include blade sensors 54 for monitoring the rotor blades 22; generator sensors 56 for monitoring the torque, the rotational speed, the acceleration and/or the power output of the generator 24; and/or shaft sensors 58 for measuring the loads acting on the rotor shaft 32 and/or the rotational speed of the rotor shaft 32. Additionally, the wind turbine 10 may include one or more tower sensors 60 for measuring the loads transmitted through the tower 12 and/or the acceleration of the tower 12. Of course, the wind turbine 10 may further include various other suitable sensors for measuring any other suitable loading and/or operating conditions of the wind turbine 10.

Figure 3:
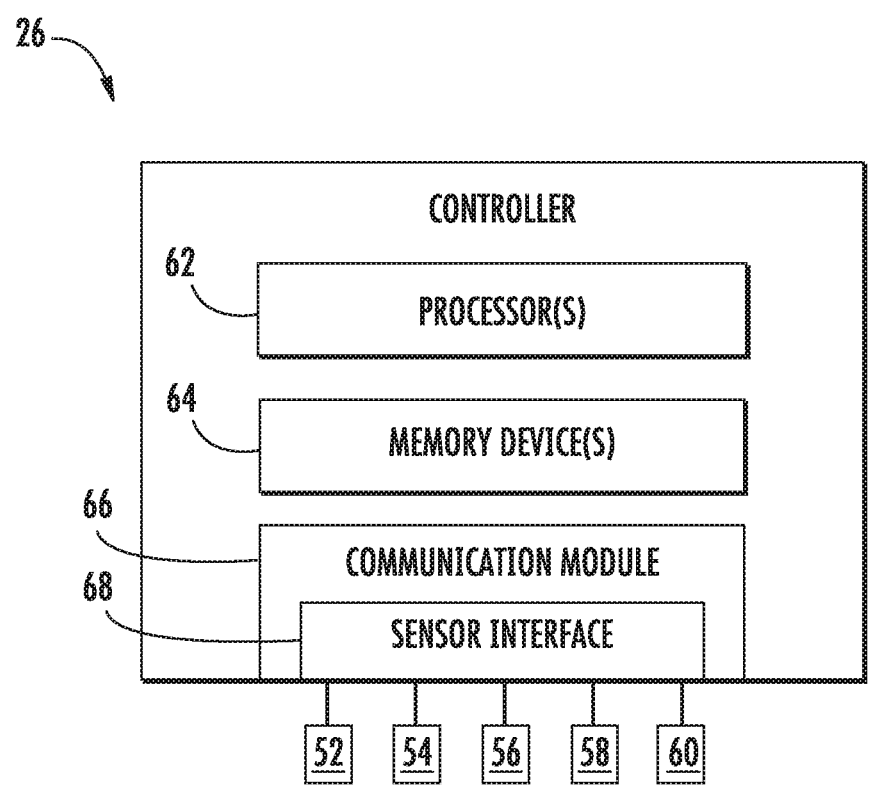
FIG. 3 illustrates a block diagram of one embodiment of suitable components that may be included in a controller of the wind turbine according to the present disclosure.

Referring now to FIG. 3, there is illustrated a block diagram of one embodiment of suitable components that may be included within the controller 26 in accordance with aspects of the present subject matter. As shown, the controller 26 may include one or more processor(s) 62 and associated memory device(s) 64 configured to perform a variety of computer-implemented functions (e.g., performing the methods, steps, calculations and the like and storing relevant data as disclosed herein). Additionally, the controller 26 may also include a communications module 66 to facilitate communications between the controller 26 and the various components of the wind turbine 10. Further, the communications module 66 may include a sensor interface 68 (e.g., one or more analog-to-digital converters) to permit signals transmitted from the sensors) to be converted into signals that can be understood and processed by the processors 62. It should be appreciated that the sensors as described herein may be communicatively coupled to the communications module 66 using any suitable means. For example, the sensors may be coupled to the sensor interface 68 via a wired connection. However, in alternative embodiments, the sensors may be coupled to the sensor interface 68 via a wireless connection, such as by using any suitable wireless communications protocol known in the art.

Figure 4:
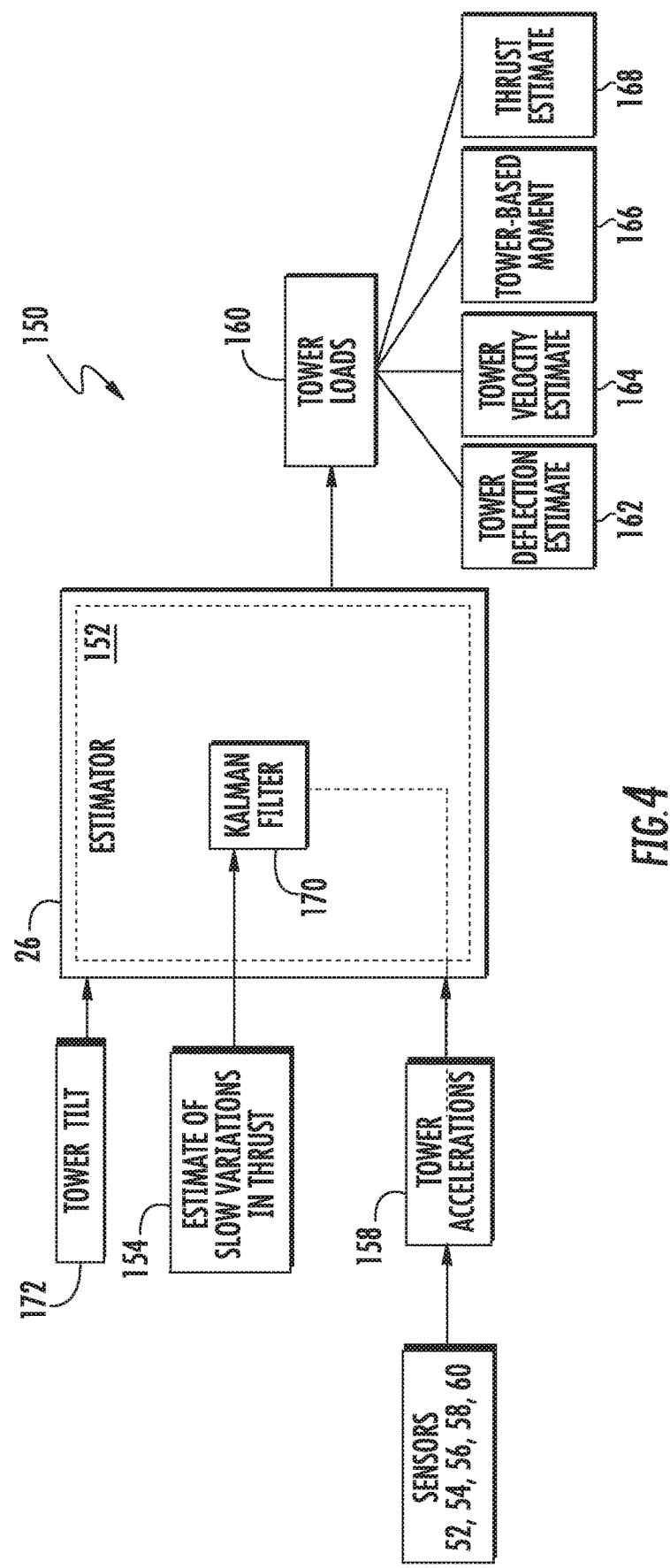
FIG. 4 illustrates a schematic diagram of one embodiment of a system for estimating tower loads of a wind turbine according to the present disclosure.

Referring now to FIG. 4, a schematic diagram of one embodiment of a system 150 for estimating tower loads 160 of a wind turbine, e.g. such as the wind turbine 10 of FIG. 1, are illustrated. As shown in the illustrated embodiment, the system 150 includes a plurality of sensors and a controller communicatively coupled to the sensors such that the controller can perform one or more operations using the sensor measurements. More specifically, as shown, the system 150 may include the turbine controller 26 and one or more of the existing sensors 52, 54, 56, 58, 60 of the wind turbine 10. For example, in certain embodiments, the sensor(s) 52, 54, 56, 58, 60 may include an accelerometer or a gyroscope configured to measure the tower accelerations of the tower 12. In addition, as shown, the controller 26 includes an estimator 152 configured to estimate tower loads 160 of the wind turbine 10. Further, as shown, the tower loads 160 may include tower deflection 162, tower velocity 164, a tower-base moment 166, a thrust estimate 168, or any other loading acting on the tower 12. In such embodiments, for example, the tower deflection 162 may include a high-bandwidth tower-top deflection. Moreover, the estimated tower loads 160 of the present disclosure include fast variations in thrust of the tower 12 in the frequency domain.

Figure 6:
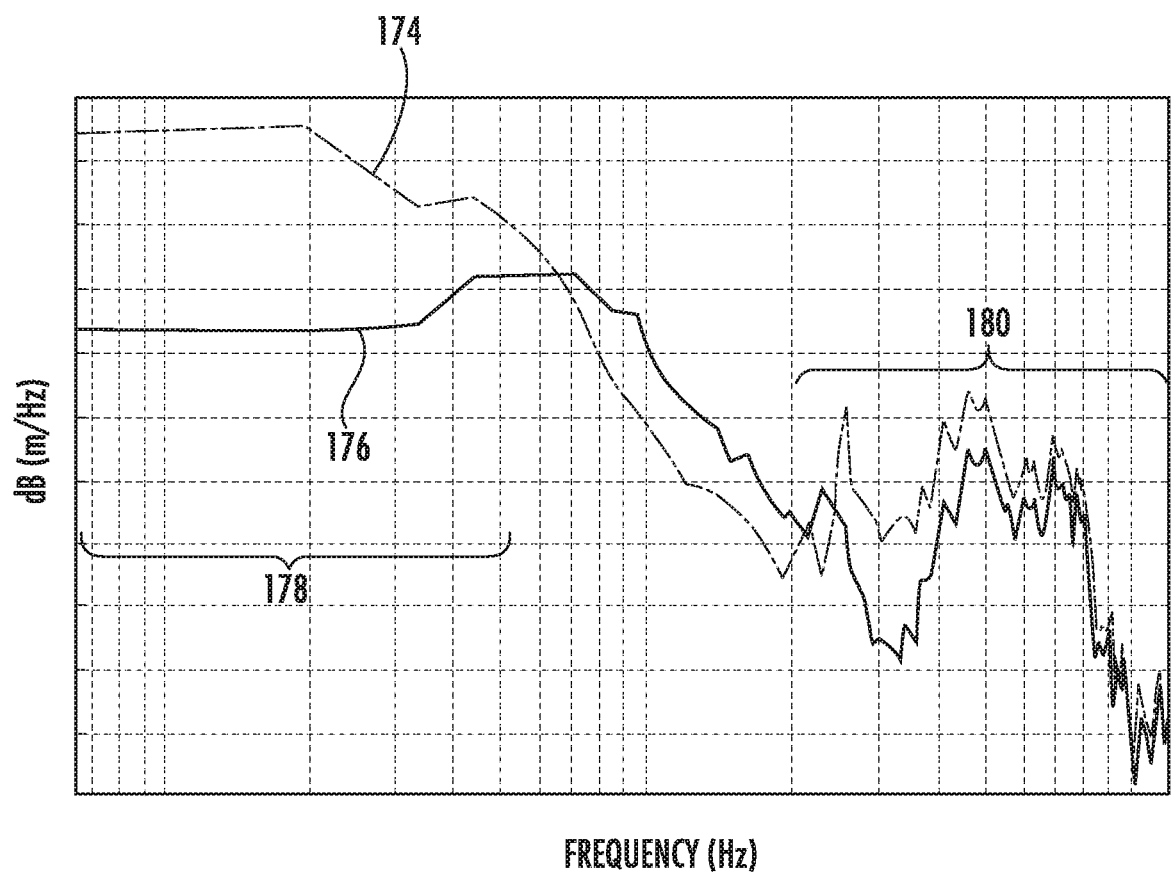
FIG. 6 illustrates various graphs of one embodiment of estimated tower deflection of a wind turbine in a frequency domain according to the present disclosure.
Figure 7:
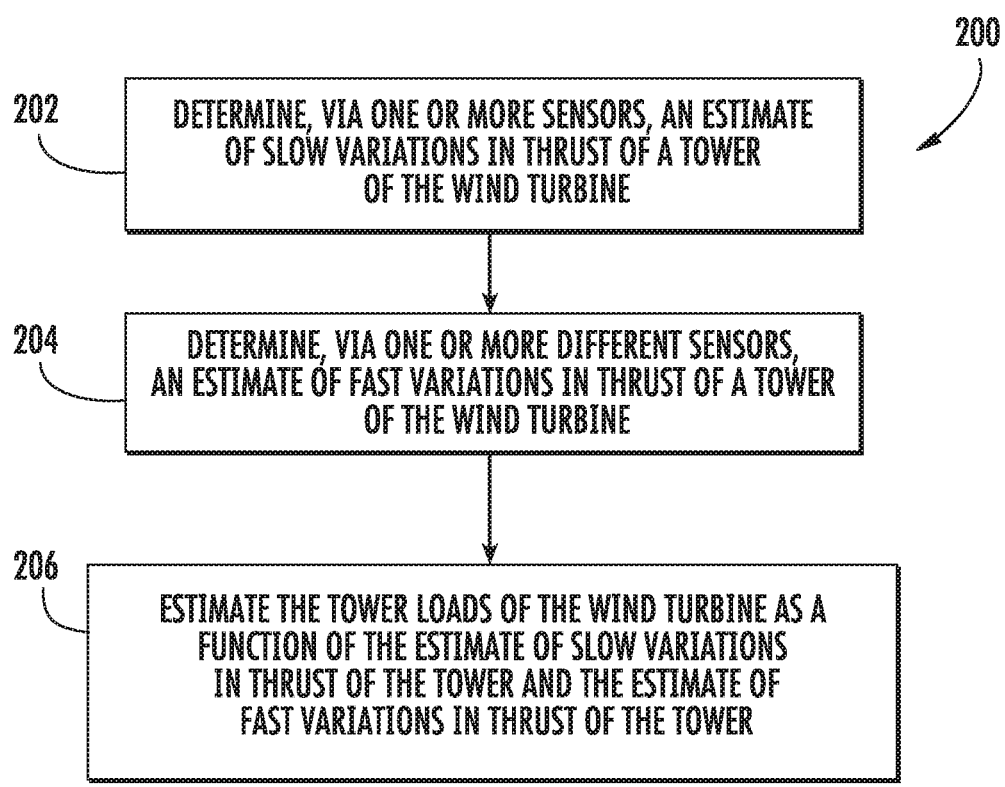
FIG. 7 illustrates a flow diagram of another embodiment of a method for estimating tower loads of a wind turbine according to the present disclosure.

More specifically, as shown, the estimator 152 is configured to receive an estimate 154 of slow variations in thrust of the tower 12 of the wind turbine 10. For example, in one embodiment, the estimator 152 is configured to estimate the slow variations in tower thrust as a function of a plurality of operating conditions, such as pitch angle, power output, and/or a rotor speed of the wind turbine 10. For example, in one embodiment, the estimator 152 is configured to approximate the slow variations of thrust in the tower 12 by estimating the rotor-average wind speed using pitch, power and rotor-speed, and then passing the variation through a look-up-table (LUT). Thus, the LUT may be a function of wind speed, rotor speed and/or pitch angle to estimate thrust. The slow variations in thrust of the tower 12 are typically defined in a frequency domain as separation between fast and slow variations are generally more defined in the frequency domain. (FIGS. 6-8). In certain embodiments, slow variations in thrust as defined by the present disclosure generally encompass variations in frequency lower than the tower natural frequency, which generally corresponds to less than about 0.3 Hertz (Hz). Thus, in particular embodiments, the slow variations of thrust may be less than about 0.1 Hz. Accordingly, as mentioned, fast variations of thrust in the frequency domain generally refer to frequency values of greater than about 0.3 Hertz.

In addition, as shown, the estimator 152 is configured to receive estimated or measured tower accelerations 158 generated by the one or more sensors 52, 54, 56, 58, 60 in order to determine the tower loads 160. More specifically, the estimator 152 is configured to estimate the tower loads 160 of the wind turbine 10 as a function of the estimate of slow variations in thrust of the tower 156 and the tower accelerations 158, e.g. such as by fusing the two values together. More specifically, as shown in FIG. 4, the system 150 may include a Kalman filter 170 programmed within the estimator 152. As used herein, a Kalman filter generally refers to an algorithm that uses a series of measurements observed over time to produce an estimate of unknown variables that are typically more precise than those based on a single measurement. As such, the Kalman filter 170 of the present disclosure is configured to estimate the tower loads 160 of the wind turbine 10 as a function of the estimate of slow variations in thrust of the tower 156 and the tower accelerations 158.

In further embodiments, the system 150 may also include one or more filters configured to filter the sensor measurements obtained from the sensors (e.g. 52, 54, 56, 58, 60). It should be understood that the filter(s) may be any suitable filter known in the art. More specifically, in certain embodiments, the filter(s) may include a notch filter, a low-pass filter, a high-pass filter, or combinations thereof.

In additional embodiments, since the tower 12 tends to tilt as it bends, the system 150 may be configured to determine a tilt 172 of the tower 12 of the wind turbine 10, e.g. via one or more sensors, and estimate the tower loads 160 of the wind turbine 10, at least in part, as a function of the tilt. More specifically, the tilt of the tower 12 may be estimated by inclinometers. Such tilt can corrupt the measured tower acceleration directly in a first order sense. As such, estimating the tower loads 160 as a function of the tower tilt provides a more accurate estimation of tower deflection.

Figure 5:
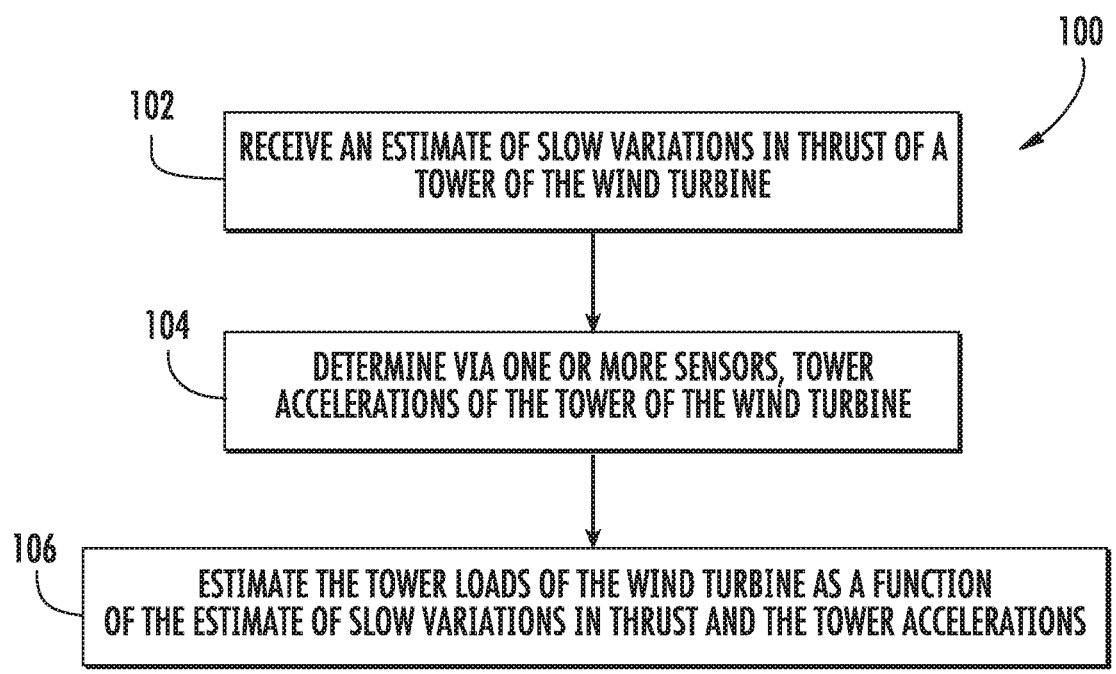
FIG. 5 illustrates a flow diagram of one embodiment of a method for estimating tower loads of a wind turbine according to the present disclosure.

Referring now to FIG. 5, a flow diagram of one embodiment of a method 100 for estimating tower loads of a wind turbine 10 is illustrated. As shown at 102, the method 100 includes receiving, via the controller 26, an estimate of slow variations in thrust of the tower 12 of the wind turbine 10. As shown at 104, the method 100 includes determining, via one or more sensors (e.g. sensors 52, 54, 56, 58, 60), tower accelerations 158 of the tower 12 of the wind turbine 12. As shown at 106, the method 100 includes estimating, via the estimator 152, the tower loads of the wind turbine 10 as a function of the estimate of slow variations in thrust of the tower 12 and the tower accelerations 158.

Referring now to FIG. 6, a graph comparing estimated tower deflection 176 and actual tower deflection 174 of a wind turbine 10 in the frequency domain is illustrated to depict the reduction in the estimator error spectrum at low and high frequencies according to the present disclosure. More specifically, as shown, the estimated tower deflection 176 has an improved low frequency error (i.e. in the low frequency spectra 178) and about the same high frequency error as the actual tower deflection 174 (i.e. in the high frequency spectra 180). In one embodiment, the improved low frequency error is obtained due to the thrust information, whereas the low error in the high frequency spectra is obtained due to information from high frequency sensors. In further embodiments, the method 100 as described herein may also include providing a 40 dB/decade drop from the tower accelerations to the estimated tower deflection 176 between a frequency domain of from about 0.1 to 1 about Hertz (Hz). Further, as shown, the estimated tower deflection 176 has an improved noise reduction. In another embodiment, the method 100 may include filtering, via a notch filter, the tower acceleration at a tower natural frequency. In addition, the method 100 may include providing a 20 dB/decade drop from the tower accelerations to the estimated tower deflection 176 between a frequency domain of from about 0.1 to 1 about Hertz (Hz). In still another embodiment, the method 100 may include filtering, via a low-pass filter, from the estimate of slow variations in thrust of the tower 12 to one or more controller outputs.

Referring now to FIG. 7, a flow diagram of another embodiment of a method 200 for estimating tower loads of a wind turbine 10 is illustrated. As shown at 202, the method 200 includes determining, via one or more sensors (e.g. sensors 52, 54, 56, 58, 60), an estimate of slow variations in thrust of the tower 12 of the wind turbine 10. As shown at 204, the method 200 includes determining, via one or more different sensors, an estimate of fast variations in thrust of the tower 12 of the wind turbine 10. Further, as shown at 206, the method 200 includes estimating, via the controller, the tower loads of the wind turbine 10 as a function of the estimate of slow variations in thrust of the tower 12 and the estimate of fast variations in thrust of the tower 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method comprising:
   estimating tower loads of a wind turbine by:
   receiving, via a controller, an estimate of slow variations in thrust of a tower of the wind turbine, wherein slow variations include variations in frequency lower than a tower natural frequency;
   determining, via one or more sensors, tower accelerations of the tower of the wind turbine;
   estimating, via the controller, the tower loads of the wind turbine as a function of the estimate of slow variations in thrust of the tower and the tower accelerations; and
   initiating control actions for the wind turbine when the estimated tower loads are at a design limit, the control actions comprising at least one of controlling an operating mode of the wind turbine, starting up the wind turbine, or shutting down the wind turbine.

2. The method of claim 1, wherein the slow variations in thrust of the tower are defined in a frequency domain, the slow variations being less than about 0.3 Hertz (Hz).

3. The method of claim 1, wherein the tower loads comprise at least one of a tower deflection or a tower-base moment.

4. The method of claim 3, wherein the tower deflection comprises a high bandwidth tower-top deflection which captures fast variations in thrust of the tower in the frequency domain of greater than about 0.3 Hertz (Hz).

5. The method of claim 4, further comprising providing a 40 dB/decade drop from the tower accelerations to the estimated tower deflection between a frequency domain of from about 0.1 to 1 about Hertz (Hz).

6. The method of claim 4, further comprising filtering, via a notch filter, the tower acceleration at the tower natural frequency.

7. The method of claim 4, further comprising providing a 20 dB/decade drop from the tower accelerations to the estimated tower deflection between a frequency domain of from about 0.1 to 1 about Hertz (Hz).

8. The method of claim 4, further comprising filtering, via a low-pass filter, from the estimate of slow variations in thrust of the tower to one or more controller outputs.

9. The method of claim 1, wherein estimating the tower loads of the wind turbine as a function of the estimate of slow variations in thrust of the tower and the tower accelerations further comprises utilizing a Kalman filter.

10. The method of claim 1, further comprising determining a tilt of the tower of the wind turbine and estimating the tower loads of the wind turbine, at least in part, as a function of the tilt.

11. A system comprising:
    one or more sensors configured to measure tower accelerations of a tower of a wind turbine; and
    a controller communicatively coupled with the one or more sensors, the controller comprising an estimator configured to perform one or more operations, the one or more operations comprising:
    receiving an estimate of slow variations in thrust of the tower, wherein slow variations include variations in frequency lower than a tower natural frequency,
    estimating the tower loads of the wind turbine as a function of the estimate of slow variations in thrust of the tower and the tower accelerations; and
    initiating control actions for the wind turbine when the estimated tower loads are at a design limit, the control actions comprising at least one of controlling an operating mode of the wind turbine, starting up the wind turbine or shutting down the wind turbine.

12. The system of claim 11, wherein the slow variations in thrust of the tower are defined in a frequency domain, the slow variations being less than about 0.3 Hertz (Hz).

13. The system of claim 11, wherein the tower loads comprise at least one of tower-top deflection or tower-base moment.

14. The system of claim 13, wherein the tower-top deflection comprises a high-bandwidth tower-top deflection which captures fast variations in wind speed and tower-top thrust in the frequency domain of greater than about 0.3 Hertz (Hz).

15. The system of claim 11, wherein the one or more sensors comprise an accelerometer, wherein the accelerometer is configured to measure the tower accelerations of the tower.

16. The system of claim 11, further comprising a Kalman filter, wherein the Kalman filter is configured to estimate the tower loads of the wind turbine as a function of the estimate of slow variations in thrust of the tower and the tower accelerations.

17. A method comprising:
estimating tower loads of a wind turbine by:
   determining, via one or more sensors, an estimate of slow variations in thrust of a tower of the wind turbine, wherein slow variations include variations in frequency lower than a tower natural frequency;
   determining, via one or more different sensors, an estimate of fast variations in thrust of a tower of the wind turbine, wherein estimate of fast variations include tower velocity of the tower; and
   estimating, via the controller, the tower loads of the wind turbine as a function of the estimate of slow variations in thrust of the tower and the estimate of fast variations in thrust of the tower; and
   providing tower damping to the tower, the tower damping comprising at least one of controlling an operating mode of the wind turbine, starting up the wind turbine or shutting down the wind turbine.

18. The method of claim 17, wherein the slow variations in thrust of the tower are defined in a frequency domain, the slow variations being less than about 0.3 Hertz (Hz).

19. The method of claim 17, wherein the tower loads comprise a high-bandwidth tower-top deflection which captures fast variations in thrust of the tower in the frequency domain of greater than about 0.3 Hertz.

* * * * *